Aug. 27, 1940.   C. D. NUGENT   2,212,647
PRESSURE FILTER
Filed July 8, 1939   2 Sheets-Sheet 1
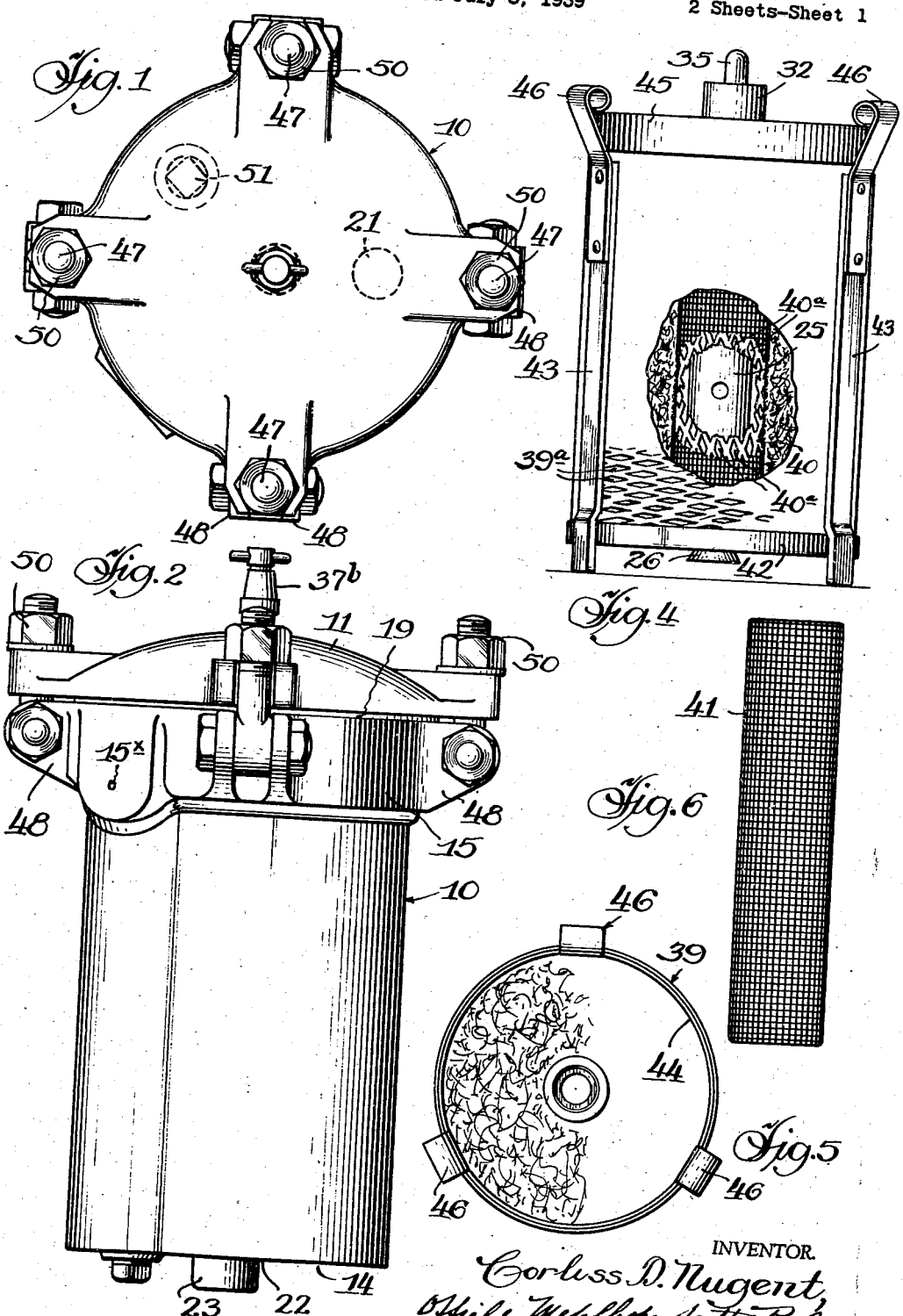
INVENTOR.
Corliss D. Nugent
ATTORNEYS.

Aug. 27, 1940.                  C. D. NUGENT                  2,212,647
                                PRESSURE FILTER
                             Filed July 8, 1939                2 Sheets-Sheet 2
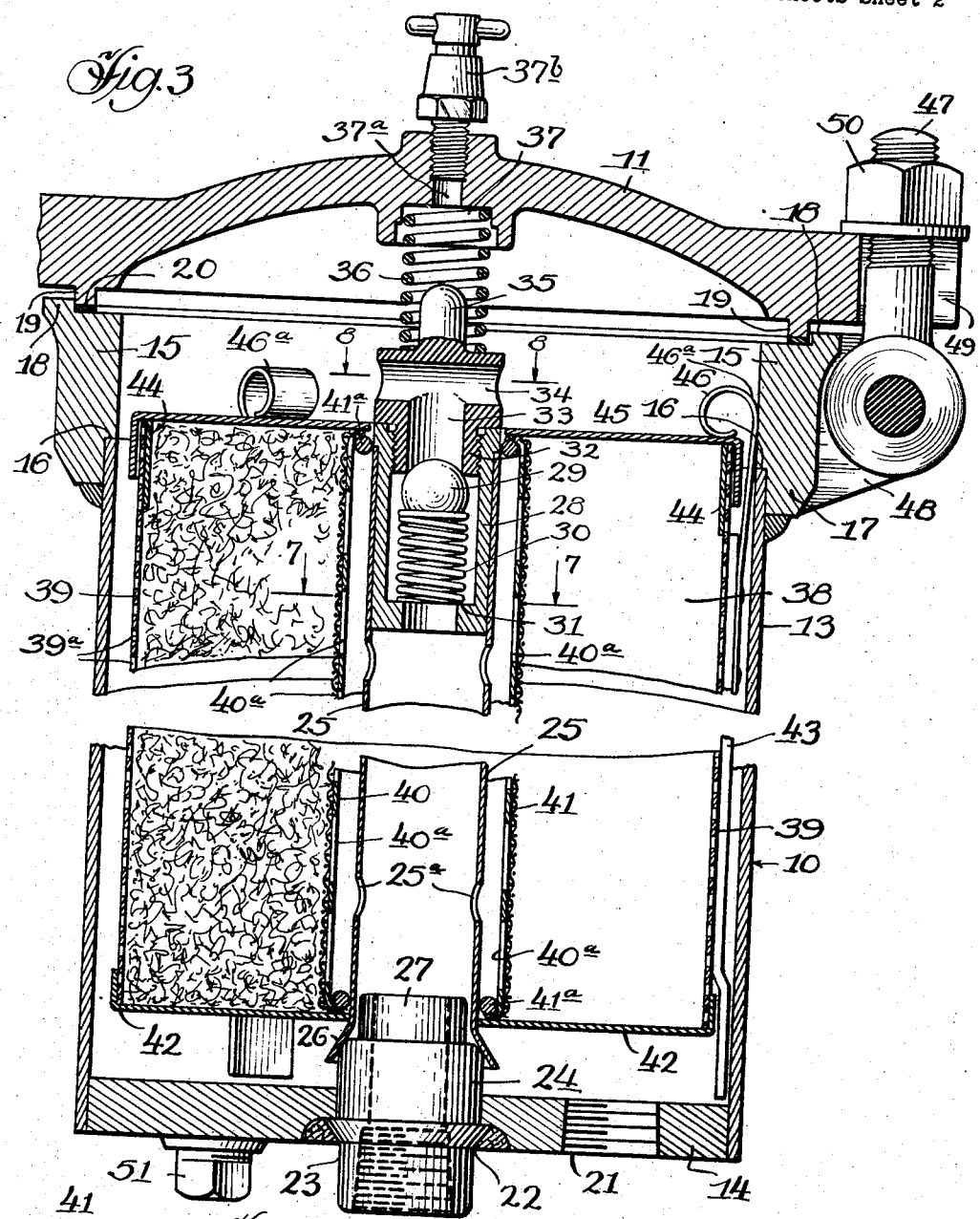
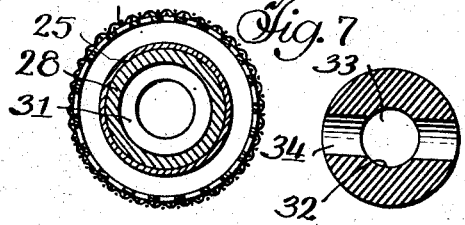
INVENTOR.
Corliss D. Nugent.
ATTORNEYS.

Patented Aug. 27, 1940

2,212,647

UNITED STATES PATENT OFFICE 2,212,647

PRESSURE FILTER

Corliss D. Nugent, Chicago, Ill.

Application July 8, 1939, Serial No. 283,441

5 Claims. (Cl. 210—131)

This invention relates to a pressure filter and consists of the matters hereinafter described and more particularly pointed out in the appended claims.

The filter is that kind which includes a casing provided with inlet and outlet openings and a removable filter element through which the oil or other liquid is forced on a path from the inlet, thence radially through the filter element, thence out through the outlet opening. It also includes a spring-controlled by-pass valve which is normally closed but is adapted to open in the direction of the outlet opening of the casing to by-pass the oil thereto when the pressure is increased above that normally intended, as occurs when the filter element has been clogged with the solid matter carried by the filter.

The object of the invention is to provide in such a pressure filter a filtering element or filter cartridge which may be quickly removed from the casing and readily opened so that the filter material, preferably cotton waste, wool, cellulose or the like, may be removed and replaced by new or cleaned waste as desired.

Another object of the invention is to provide in a pressure filter of the kind a retainer for the filtering medium having a removable closure or cap which is easily released when the cartridge has been removed from the casing, and which may be automatically re-engaged in the act of returning the filter cartridge to the casing.

Another object of the invention is to provide the cartridge element with supporting members which will hold the cartridge element above the floor or other base upon which it is set while the filtering material is being removed and replaced, and which at the same time will not interfere with the proper insertion of the cartridge into the casing after the charge of filter material has been replaced.

These and other advantages of the invention will appear more fully as I proceed with my specification.

In the drawings:

Figure 1 is a top plan view of the improved pressure filter.

Figure 2 is a side elevation of the same.

Figure 3 is a vertical central section through the pressure filter.

Figure 4 is a side elevation of the cartridge element as it appears when removed from the casing and set upon the floor or other support, with parts broken away to show the inner construction.

Figure 5 is a top plan view of the cartridge as it appears when the closing cap has been removed.

Figure 6 is a side elevation of a fine wire gauze element of the cartridge.

Figure 7 is a partial cross section of the cartridge element taken on line 7—7 of Figure 3.

Figure 8 is a partial section of an apertured plug which presents a seat for the by-pass valve, the plane of the section being indicated by the line 8—8 of Figure 3.

Referring now to that embodiment of the invention illustrated in the drawings: 10 indicates the filter casing, and 11 indicates a cover removably secured thereto. The casing consists of a cylindrical shell 13 having rigidly secured within it a bottom wall 14 of heavier material. A flanged ring 15 embraces the top end of the shell 13, with the upper end thereof abutting an annular shoulder 16 spaced above the bottom edge of the flange 17 of the ring. The top of the ring 15 is provided with an annular inwardly facing shoulder 18 within which is engaged a depending rib 19 of the cover 11,—a gasket 20 being interposed between the top of the ring 15 and the bottom end of the rib 19.

The bottom wall 14 is provided with a threaded inlet opening 21 at one side and with a central outlet opening 22 in which is seated and fixed a threaded thimble 23. The thimble 23 has an upwardly projecting nipple 24 which extends above the top of the bottom wall 14. 23 indicates a vertically disposed tube having a flared bottom end 26 which rests upon the top of the nipple 24. Said nipple has a centering vertical extension 27 which projects within the bottom end of the tube 25 and above its flared end 26.

The tube 25 has a tubular valve fitting 28 fixed within its upper end and containing a ball by-pass valve element 29 and a coiled spring 30, which reacts between said ball and an inturned annular shoulder 31. The upper end of the fitting 28 is threaded to receive the threaded end of an apertured plug 32 which provides a seat for the ball valve 29. Said plug is provided with a vertical bore 33 and is made of larger diameter above the fitting 28 where it is provided with a horizontal transverse bore 34 connected to the bore 33. The plug 32 has an upwardly projecting pin 35 which centers an expanding coiled spring 36 engaged at its upper end in a recess 37 formed on the underside and at the center of the cover 11, and at its other end is engaged against the top of the plug 32. When the cover 11 is closed, it provides a yielding pressure against the tube 25 to hold the flared bottom end 26 of said tube in engagement with the rounded top of the nipple 24, thus securely closing said tube on said nipple. A vertical threaded aperture 37ª in the cover 11, preferably at the center of the recess 37, and a threaded hand-operated closing plug 37ᵇ, provides for the escape of air when oil or other liquid to be filtered is first introduced into the filter.

38 indicates as a whole a filter cartridge which contains the cotton waste or other filter material through which the liquid to be filtered is designed to be passed. Said element comprises an outer cylindrical, apertured shell 39 of somewhat smaller diameter than the diameter of the casing 10, and an inner cylindrical, apertured shell 40 of somewhat larger diameter than the tube 25, which is located centrally within it. Both the inner and outer shell are made of expanded metal with the elongated apertures 39ª of the outer shell 39 as shown in Figure 4 disposed at right angles to the like apertures 40ª of the inner shell 40. A fine mesh wire gauze cylinder 41 is fixed to the outer face of the inner shell 40 (see Figure 3). The cartridge 38 is closed at the bottom by an apertured flanged disc 42 fixed in any convenient manner as by spot-welding by its flange to the outer shell 39 and closed at its aperture against the tube 25, above its flared bottom end 26. The inner shell 40 with the fine mesh wire cylinder 41 is provided with top and bottom fixed spacing rings 41ª, 41ª concentric with the tube 25 and having a sliding fit thereon. Preferably said rings are fixed to the inner shell 40 by partly wrapping the wire gauze of the cylinder 41 about the rings 41ª, 41ª. The inner shell 40 rests upon the bottom disc 42.

Placed at equal arcuate distances about the outer shell 39 of the filter cartridge are fixed bars 43,— there being three of such bars in this case. Said bars project below the bottom wall 42 of the cartridge a distance somewhat less than the distance between said bottom wall 42 and the top of the casing bottom wall 14 so as to clear the same. The outer shell 39 is held in proper shape at the top by a metal band 44 (see Figure 7). The top of the cartridge is closed by a removable flanged disc or cap 45 which is apertured at the center to receive the plug 32. 46 indicates spring latches for retaining the cap 45 in closed relation upon the cartridge body 38. Said latches are spaced at equal arcuate distances about the top of the shell 39,— there being three as shown in this case, and are preferably fixed to the upper ends of the leg bars 43 adjacent to the cap 45. Each latch is a flat spring bar which projects above the top of the cap 45, and is there bent to rounded or volute form for ready engagement with the top of the cap.

The cover 11 is locked to the top of the casing by means of swing bolts 47 pivoted between radially extending ears 48 fixed to the ring 15 and engageable within radial open eyes 49 on the cap 11. 50 indicate nuts which, when screwed down on the swing bolts 47, securely lock the cover in place.

Assume that the pressure filter is assembled with all parts in position as above described and with the cartridge element 38 filled with waste,— the operation of the pressure filter is as follows:

Oil under pressure enters through the inlet opening 21 in the bottom wall. It is directed radially outward and guided by the bottom wall 14 of the cartridge into the annular space between the main casing 13 and the outer shell of the cartridge element 38. Through said space it rises and passes through the apertures 39ª in the outer shell 39 into and through the cotton waste, thence through the fine mesh wire gauze cylinder or sleeve 41 and through the apertures 40ª of the inner shell 40, whence it passes through the usual openings 25ª in the tube 25 into the interior of said tube, and then downwardly (since its passage upwardly is prevented by the normally closed valve ball 29) to and through the outlet in the thimble 23. The plug 37ᵇ is removed to permit the escape of air in the filter and is then replaced. The filter then operates in a familiar manner until on account of an accumulation of dirt, grit or other material filtered out by the cotton waste, the pressure is caused to rise above a predetermined point, (that is to say, a point sufficient to force the oil, which has been raised above the cap 45, to pass through the horizontal bore 34 and the vertical bore 33 in the plug 32, and depress the ball 29 from its seat). Thereupon the oil will be by-passed directly downwardly through the tube 25 until the excess pressure is relieved.

When it is desired to replace and renew the waste in the cartridge 38, the flow of liquid to the filter is stopped and the oil therein is drained by removing a threaded plug 51 in the bottom wall 14 of the casing. To permit a free outflow of the oil, the plug 37ᵇ in the cover 11 is withdrawn. The nuts 50 are then unscrewed and the cover 11 removed. Then the cartridge may be lifted bodily out of the casing by engagement of a suitable tool in the horizontal bore 34 of the plug 32 or by grasping the spring latches 46. When it is removed, the latches 46 which have been held in engagement with the cap 45 because of the engagement of their flat shanks as at 46ª (see Figure 3) against the inner periphery of the ring 15, spring out from engagement with the cap as shown in Figure 4. The cartridge may be then set on the floor as illustrated in said figure, without damaging the seat 26, and the cap 11 may be removed.

After taking out sufficient waste at the top of the cartridge 38 to get at the top end of the inner shell 40, said shell may be removed, sliding longitudinally upon the tube 25. This exposes the waste so that it may be shaken out. The inner shell 40 is then replaced and the cartridge packed with new or clean waste. The cap is then replaced upon the top of the cartridge.

The cartridge may then be returned to the original position, with the flared end of the tube 25 resting upon the top of the nipple 24, being guided into proper position by pilot 27 (Figure 3). In thus inserting the cartridge into the casing the latches 46 by engagement with the inner surface of the ring 17 will be forced into position to hold the cap 45 closed down on the cartridge. The cover 11 is then replaced and secured as before, when the pressure filter is again ready for use.

Preferably the ring 15 at the top of the casing is provided with a small opening 15ˣ (see Figure 2) in order to connect the filter to a drain tank, where such tank is used. This opening is in the order of $\frac{3}{32}$ of an inch in diameter and permits a continuous escape of air from the filter casing without materially reducing the pressure of the liquid in the filter.

I claim as my invention:

1. In a pressure filter in combination with a casing having a fixed bottom wall and a removable cover detachably secured thereto, a filter cartridge within said casing comprising an outer apertured shell having a fixed bottom wall, a centrally disposed apertured tube depending through and fixed to said bottom wall, said tube having a flared bottom end, means providing an outlet passage from said tube presenting a seat for its flared bottom end, an inner apertured shell concentric with said tube and slidably fitting thereon, by-pass valve mechanism secured to the upper end of said tube, a cap enclosing the top of said cartridge, and means providing legs for said cartridge extending below the plane of the bottom of said flared end of the tube but terminating short of the bottom wall of said casing.

2. In a pressure filter in combination with a casing having a fixed bottom wall and a removable cover detachably secured thereto, a filter cartridge within said casing comprising an outer apertured shell having a fixed bottom wall, a centrally disposed apertured tube depending through and fixed to said bottom wall, said tube having a flared bottom end, means providing an outlet passage from said tube presenting a seat for its flared bottom end, an inner apertured shell concentric with said tube and slidably fitting thereon, by-pass valve mechanism secured to the upper end of said tube, a cap enclosing the top of said cartridge, means providing legs for said cartridge extending below the plane of the bottom of said flared end of the tube but terminating short of the bottom wall of said casing, and yielding means for locking said cap to said cartridge held in locking position by the inner wall of said casing.

3. In a pressure filter in combination with a casing having a fixed bottom wall and a removable cover detachably secured thereto, a filter cartridge within said casing comprising an outer apertured shell having a fixed bottom wall, a centrally disposed apertured tube depending through and fixed to said bottom wall, said tube having a flared bottom end, means providing an outlet passage from said tube presenting a seat for its flared bottom end, an inner apertured shell concentric with said tube and slidably fitting thereon, by-pass valve mechanism secured to the upper end of said tube, a cap enclosing the top of said cartridge, and annularly spaced bars fixed to the outer apertured shell and depending below the plane of the bottom of said flared end of the tube but terminating short of the bottom wall of said casing.

4. In a pressure filter in combination with a casing having a fixed bottom wall and a removable cover detachably secured thereto, a filter cartridge within said casing comprising an outer apertured shell having a fixed bottom wall, a centrally disposed apertured tube depending through and fixed to said bottom wall, said tube having a flared bottom end, means providing an outlet passage from said tube presenting a seat for its flared bottom end, an inner apertured shell concentric with said tube and slidably fitting thereon, by-pass valve mechanism secured to the upper end of said tube including a plug having a vertical passage and a transverse passage intersecting the same, a cap enclosing the top of said cartridge, means providing legs for said cartridge extending below the bottom of said flared end of the tube but terminating short of the bottom wall of said casing, and yielding means for locking said cap to said cartridge, said locking means being held in locking position by the inner wall of said casing.

5. In a pressure filter in combination with a casing and a cover removably secured thereto, said casing having inlet and outlet openings at the bottom, a removable cartridge for containing waste filter material comprising an outer apertured shell having a fixed bottom, a centrally disposed apertured tube depending through and fixed to said bottom wall, said tube having a flared bottom end, an inner apertured shell concentric with said tube and having a slidable fit thereon, a removable flanged cap enclosing the top of said cartridge, a valve piece fixed in the upper end of said tube provided with a discharge aperture at the bottom, a plug threaded into said valve piece and being provided with a vertical passageway in line with the discharge aperture of said valve piece, and a transverse passage intersecting the first named passage above said cap, a spring-actuated valve closing the bottom of said vertical passage, an expanding coiled spring interposed between the cover of said casing and the top of said plug, vertically extending legs fixed to the outer shell of said cartridge, said legs depending below the bottom of said cartridge and below the plane of the flaring bottom end of said tube, and an apertured outlet plug formed to provide a seat for said flared bottom end of said tube and a centering member above said seat, said seat being at a level such that the legs clear the bottom of the casing when the cartridge is within the said casing, and spring latches projecting above said cartridge adapted for engagement with the cap of said cartridge, said springs normally tending to be disengaged from said cap, but being held in engagement therewith by means in the casing engageable therewith.

CORLISS D. NUGENT.